United States Patent
Ignasiak et al.

(10) Patent No.: US 7,911,768 B2
(45) Date of Patent: Mar. 22, 2011

(54) DRAWOUT DOOR INTERFACE FOR CIRCUIT BREAKER

(75) Inventors: Tomasz Ignasiak, Bielsko-Biala (PL); Adam Skrudlik, Bielsko-Biala (PL)

(73) Assignee: General Electric Company, Schenectady, NY (US)

( * ) Notice: Subject to any disclaimer, the term of this patent is extended or adjusted under 35 U.S.C. 154(b) by 62 days.

(21) Appl. No.: 12/189,922

(22) Filed: Aug. 12, 2008

(65) Prior Publication Data
US 2010/0008024 A1    Jan. 14, 2010

(30) Foreign Application Priority Data
Jul. 11, 2008  (PL) .......................................... 385646

(51) Int. Cl.
*H02B 11/02*    (2006.01)
(52) U.S. Cl. ..................... 361/608; 361/673; 200/50.21; 200/302.1
(58) Field of Classification Search .......... 361/605–609, 361/614–617, 673; 200/50.21–50.27, 293, 200/302.1
See application file for complete search history.

(56) References Cited

U.S. PATENT DOCUMENTS

| | | | | |
|---|---|---|---|---|
| 2,811,618 A | * | 10/1957 | Cole et al. | 200/293 |
| 2,858,389 A | * | 10/1958 | Cuorato et al. | 200/50.26 |
| 2,959,714 A | * | 11/1960 | Yarrick | 361/608 |
| 3,075,061 A | * | 1/1963 | Dwyer, Jr. et al. | 200/302.1 |
| 5,495,388 A | * | 2/1996 | Bonetti et al. | 361/609 |
| 2010/0025202 A1 | * | 2/2010 | Mittu et al. | 200/50.21 |
| 2010/0072039 A1 | * | 3/2010 | Coomer et al. | 200/50.21 |

FOREIGN PATENT DOCUMENTS

| | | |
|---|---|---|
| DE | 4331778 A1 | 10/1994 |
| EP | 620623 A1 * | 10/1994 |
| EP | 0620625 A1 | 10/1994 |

OTHER PUBLICATIONS

English translation DE4331778.*
English translation of EP0620625.*
English translation of Bonetti et al. DE4331778, dated Dec. 14, 2009. Machine translated on Dec. 14, 2009.*
English translation of Bur et al., EP0620625, adted Apr. 6, 1994. MAchine translated on Dec. 14, 2009.*
English abstract for EP0620625 A1, retrieved from Esp@net, http://ep.espacenet.com retrieved Sep. 15, 2008.
English abstract for EP4331788 A1, retrieved from Esp@net, http://ep.espacenet.com retrieved Sep. 15, 2008.
Search report for Polish patent application P-385646, created Jul. 18, 2008.

* cited by examiner

*Primary Examiner* — Robert J Hoffberg
(74) *Attorney, Agent, or Firm* — Cantor Colburn LLP

(57) ABSTRACT

A drawout system with an interface proving a lower ingress protection rating is provided. The system includes a flange mounted to a door. A sleeve is movably mounted to the door adjacent to the flange. As the circuit breaker is moved from a racked-in position to a test position to a racked-out position, the sleeve moves with the circuit breaker and avoids creating exposure to electrical components within the drawout. The drawout system allows the operator to operate the circuit breaker with the door open or closed.

20 Claims, 10 Drawing Sheets

US 7,911,768 B2

DRAWOUT DOOR INTERFACE FOR CIRCUIT BREAKER

BACKGROUND OF THE INVENTION

The subject matter disclosed herein relates to a door interface for a circuit breaker drawout mechanism. In particular, the subject matter disclosed herein relates to an interface that provides ingress protection while the circuit breaker is located in different positions within the draw out mechanism.

Drawout circuit breakers often include a mechanism for moving the breaker in and connecting the breaker to corresponding electrical contacts, a location known as the "racked-in" position. When in the racked-in position, the circuit breaker is coupled to the main electrical circuit and provides the interruption functionality for which it is intended. If the drawout mechanism is reversed to the "racked-out" position, the circuit breaker is disconnected from the electrical contacts and the main electrical circuit. The circuit breaker may be moved to the racked-out position, for example, when maintenance is performed on the main electrical circuit. Typical racking mechanisms often include a third or test position. In the test position the circuit breaker can be closed, opened or tripped in order to check internal and external accessories such as auxiliary switches, shunt trip and under voltage and secondary circuits.

During each of the positions, it is desirable for the drawout mechanism to provide ingress protection (IP) such as IP4X defined by international standard IEC 60529. IP sets limits on openings in the equipment that would allow the insertion objects, such as a finger or wires for example, that could contact electrically live components. In the case of IP4X, openings cannot allow an object larger than 1 mm.

While existing circuit breaker drawout mechanisms are suitable for their intended purposes, there still remains a need for improvements particularly regarding the interface between the circuit breaker and the drawout mechanism that provides for ingress protection and allows the drawout housing door to be opened when the circuit breaker is in the racked-in, racked-out and the test positions.

SUMMARY OF THE INVENTION

A drawout interface for a circuit breaker is provided having a door. The door has a first opening and a first side and a second side. A flange is disposed about the opening and fixedly coupled to the door first side. The flange has a first projection that extends into the first opening. A sleeve is movably coupled to the door and positioned within the first opening, the sleeve has a second opening therethrough. A spring is also coupled between the sleeve and the door second side.

Another drawout interface is provided having a door with a first and second side and a first opening extending therethrough. A flange is mounted to the door first side and extends around the periphery of the first opening. The flange includes a first projection extending into the first opening. A sleeve is coupled to move between a first position and a second position within the first opening wherein a first gap is formed between the sleeve and the flange. The sleeve is sized such that the first gap is equal to or less than a predefined distance when the sleeve is in the second position. A biasing member is coupled between the door second side and the sleeve. The biasing member is arranged to bias the sleeve toward the first position.

A drawout mechanism is also provided having a housing. A mechanism is arranged within the housing and movable between a first position, a second position and a third position. A circuit breaker is coupled to the mechanism, wherein the circuit breaker is electrically connected to electrical contacts in the first position. The circuit breaker is further disconnected from the electrical contacts when in the second and third positions, the circuit breaker has a front face opposite the electrical contacts. A door is rotatably coupled to the housing, the door having a first opening therein. A frame is coupled to the circuit breaker front face, the frame having an edge opposite the front face. A sleeve is movably positioned within the first opening and has a plurality of sidewalls extending about a periphery. The sidewalls define a second opening therethough. The sleeve further includes a surface along one end of the sidewalls wherein the sleeve is positioned such that the surface contacts the edge when the mechanism is in the second position and the third position. Finally, a spring is coupled between the sleeve and the door.

BRIEF DESCRIPTION OF THE DRAWINGS

Referring now to the drawings, which are meant to be exemplary and not limiting, and wherein like elements are numbered alike.

DETAILED DESCRIPTION

Figure 1:
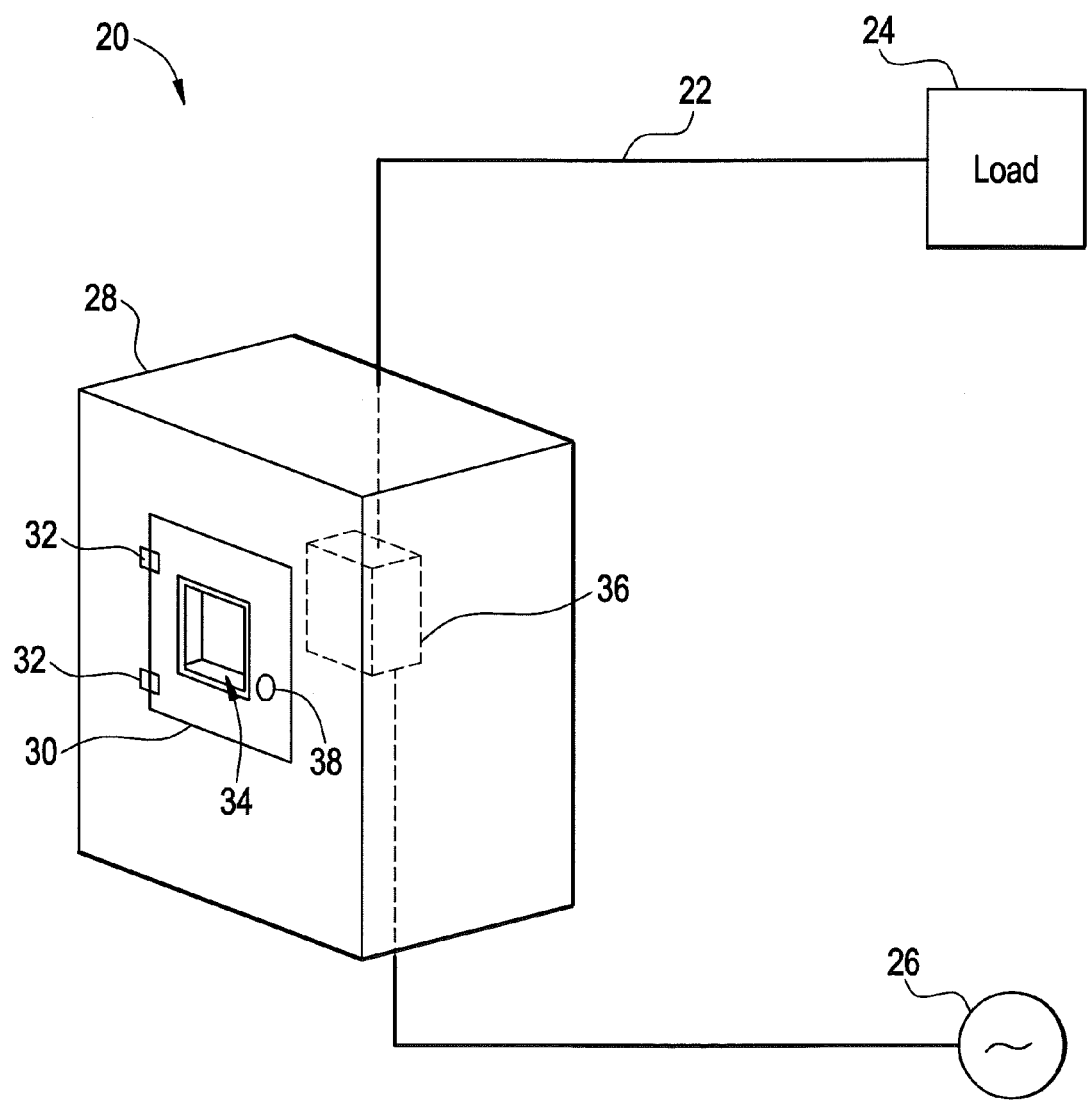
FIG. 1 is a schematic perspective view illustration of a drawout circuit breaker system in accordance with the exemplary embodiment.

FIGS. 1-4 illustrate a drawout circuit breaker system 20. The drawout circuit breaker 20 is coupled between a main electrical circuit 22 having a protected load 24 and a power source 26 such as an electrical utility network. The drawout circuit breaker 20 includes a housing 28. A door 30 is coupled to the housing 28 by hinges 32. As will be discussed in more detail below, the door 30 includes an opening 34 that allows the operator access to a circuit breaker 36 located within the housing 28. Another opening 38 allows the operator to activate a drawout mechanism 40. The circuit breaker 36 is electrically coupled between the power source 26 and the protected load 24.

It should be appreciated that the circuit breaker 36 is illustrated in the exemplary embodiment having a single connection to the power source 26 and the protected load 24. However, the circuit breaker 36 may be comprised of multiple electrical phases or connections. Further, the circuit breaker 36 may be known as a multi-pole circuit breaker having multiple contact arms that connect and disconnected the main electrical circuit 22 from the power source 26. A "multi-pole" circuit breaker the circuit breaker will typically have three or four poles, each carrying a different phase of electricity through the circuit breaker 36. Further, in the exemplary embodiment, the circuit breaker 36 is a molded case circuit breaker (MCCB) where the circuit breaker components are housed within an insulated polymer housing. However, but other types of circuit breakers, such as open frame air circuit breakers may also be used.

Figure 2:
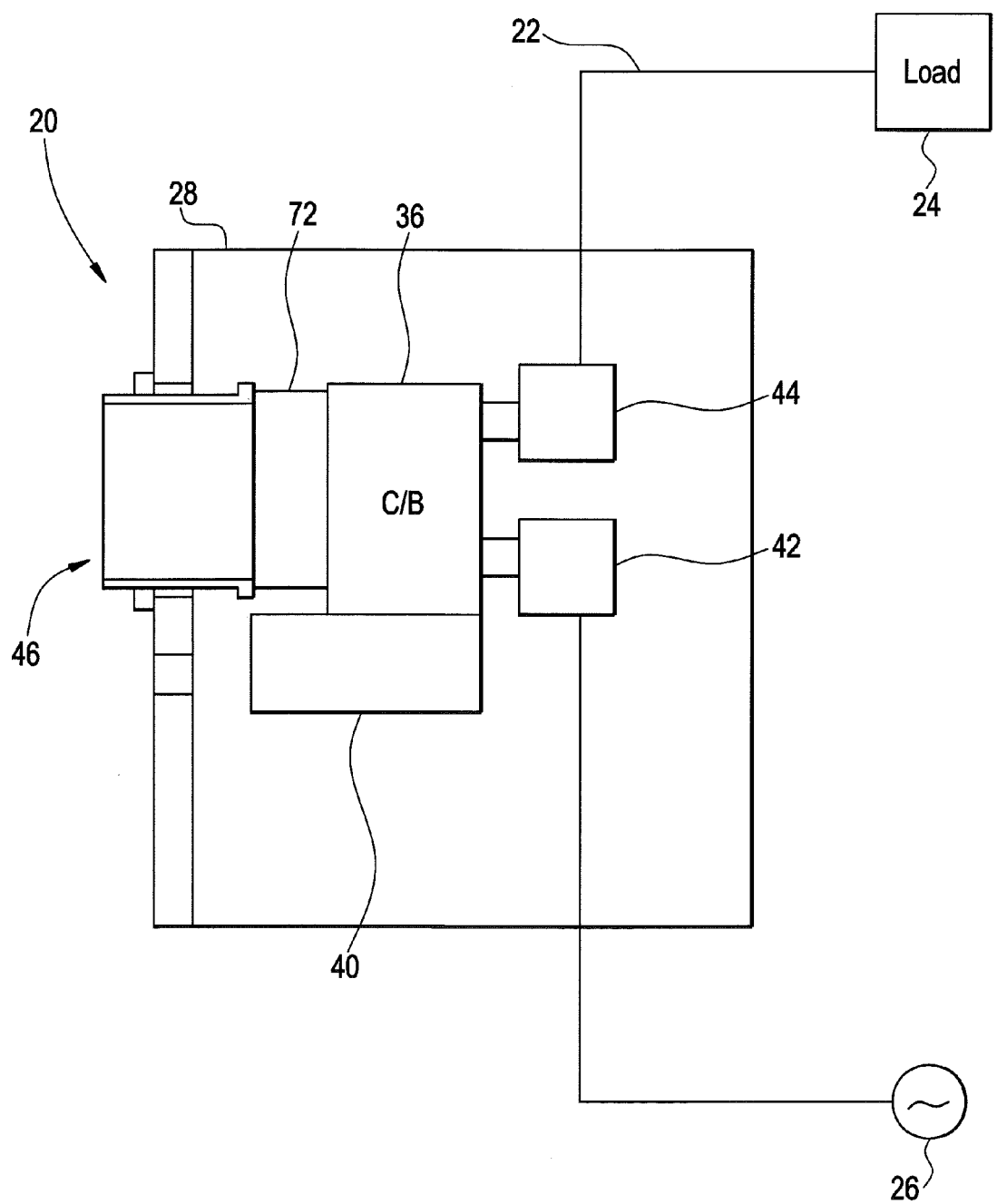
FIG. 2 is a schematic plan side view illustration of the drawout circuit breaker system of FIG. 1 in the racked-in position.
Figure 3:
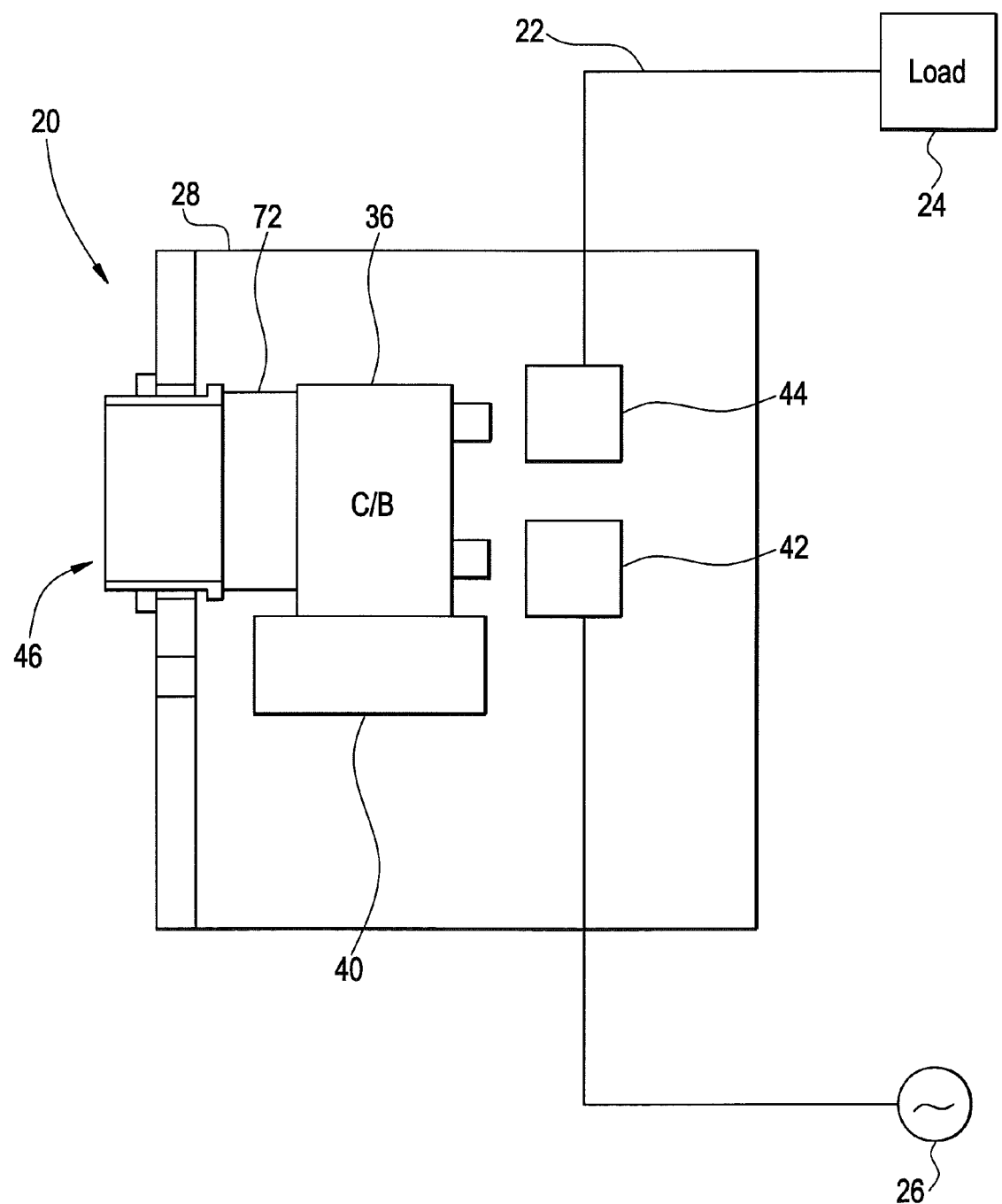
FIG. 3 is a schematic plan side view illustration of the drawout circuit breaker system of FIG. 1 in the test position.
Figure 4:
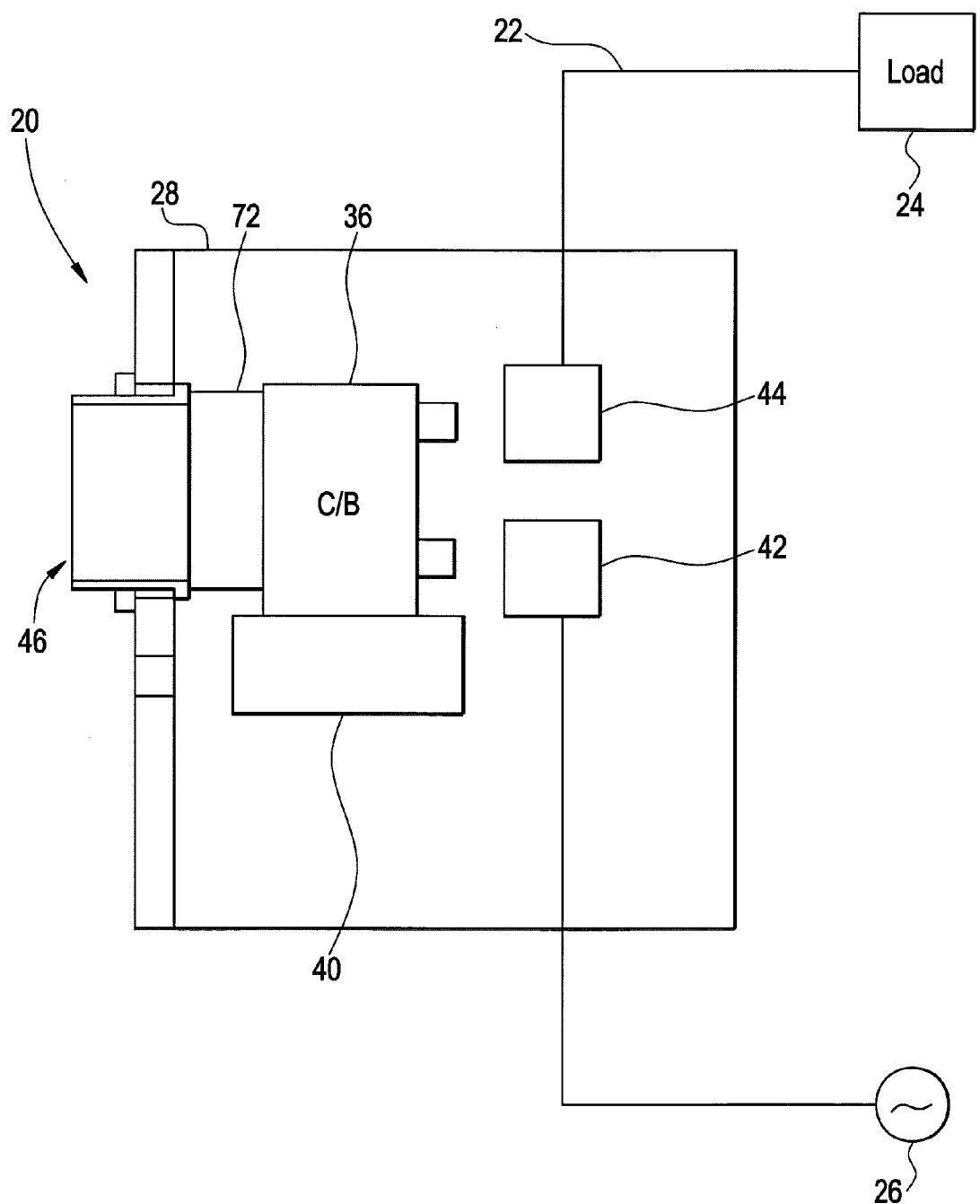
FIG. 4 is a schematic plan side view illustration of the drawout circuit breaker system of FIG. 1 in the withdrawn or racked-out position.
Figure 5:
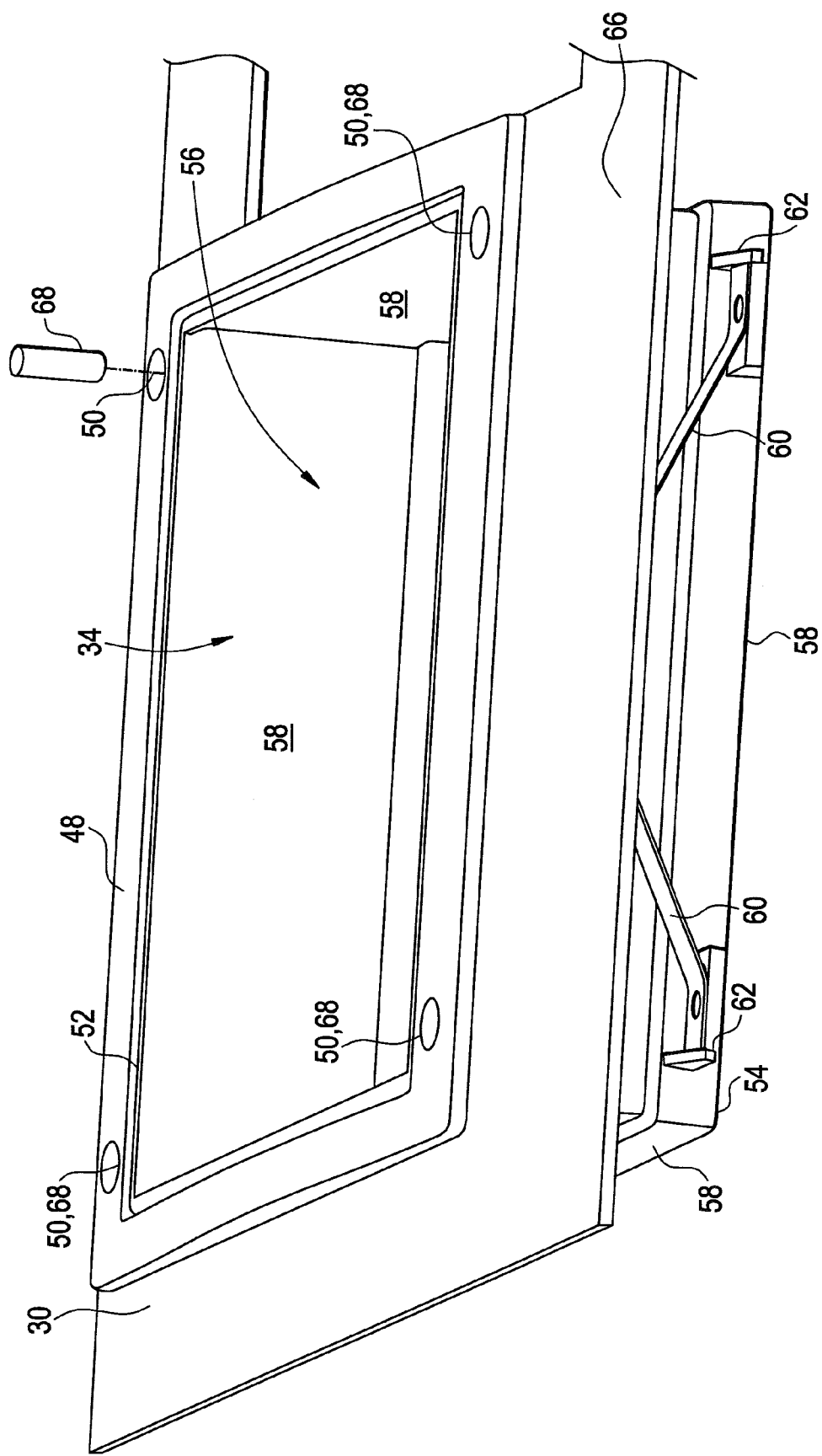
FIG. 5 is a perspective plan view illustration of the drawout interface for the drawout circuit breaker system of FIG. 1 in the racked-in position.
Figure 6:
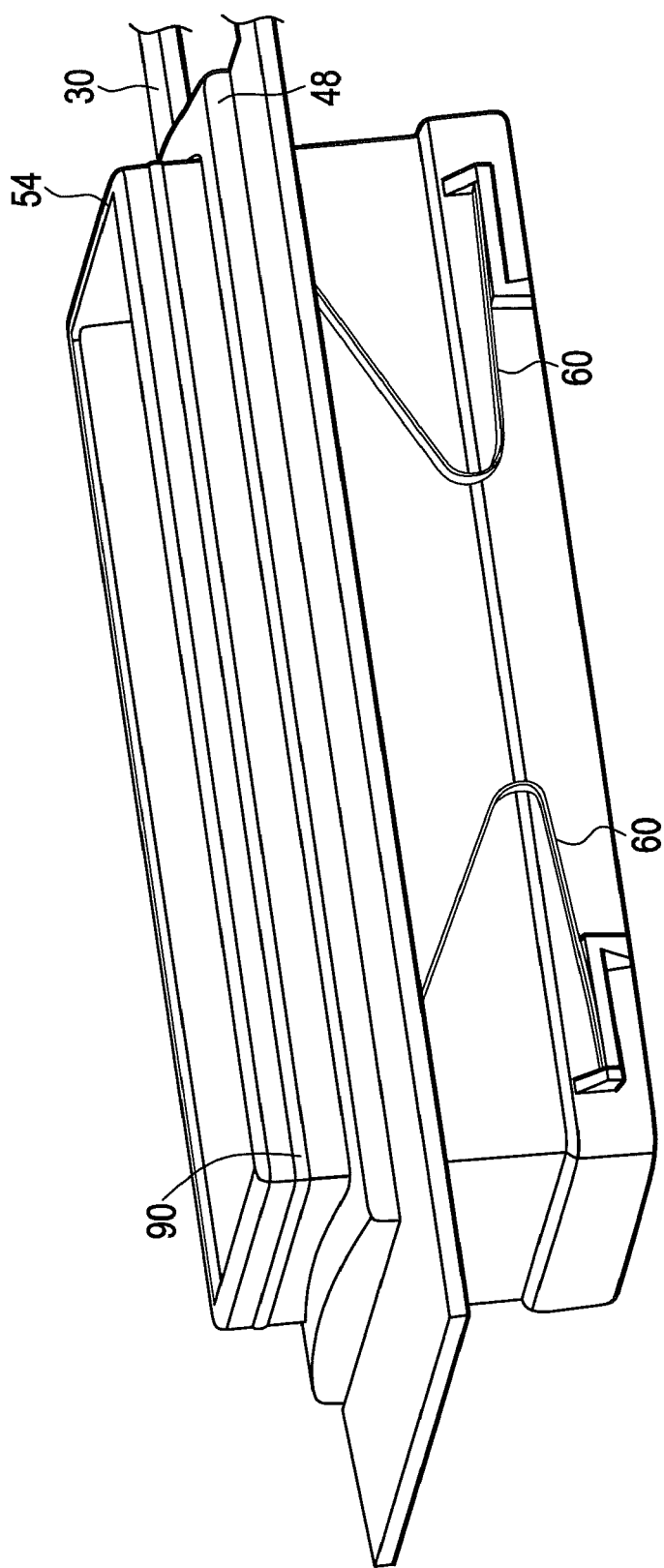
FIG. 6 is a perspective plan view illustration of the drawout interface for the drawout circuit breaker system of FIG. 1 in the test position.
Figure 7:
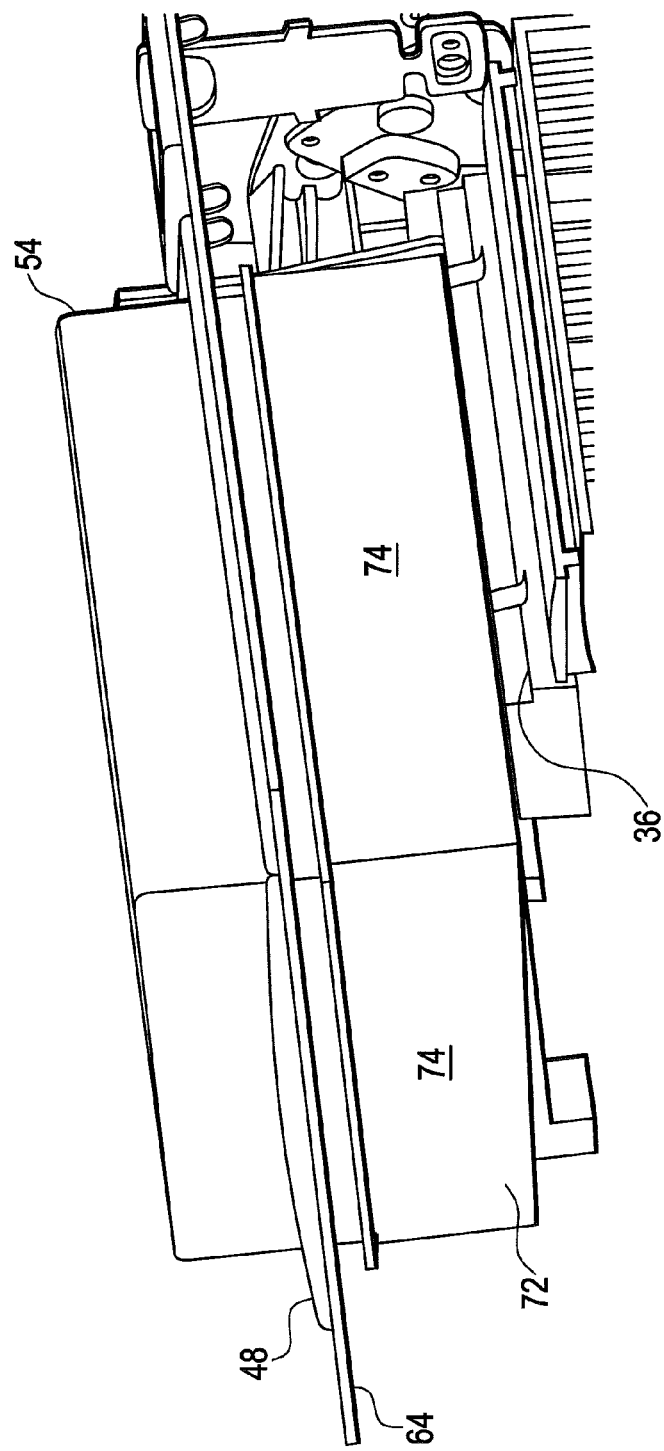
FIG. 7 is a side plan view illustration of the drawout circuit breaker system of FIG. 1 in the racked-out position; and, FIG. 8 is a partial perspective view illustration partially in section of the drawout circuit breaker system of FIG. 1.
Figure 8:
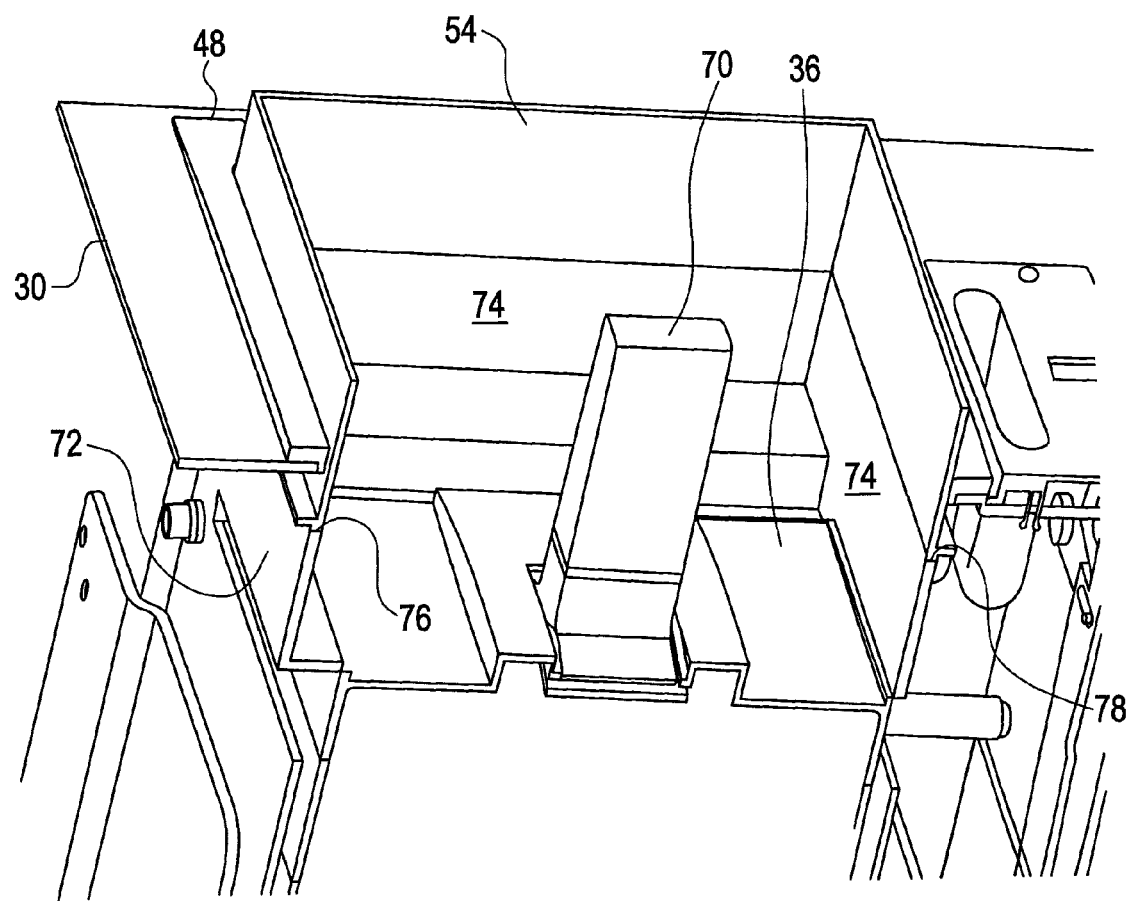
Figure 9:
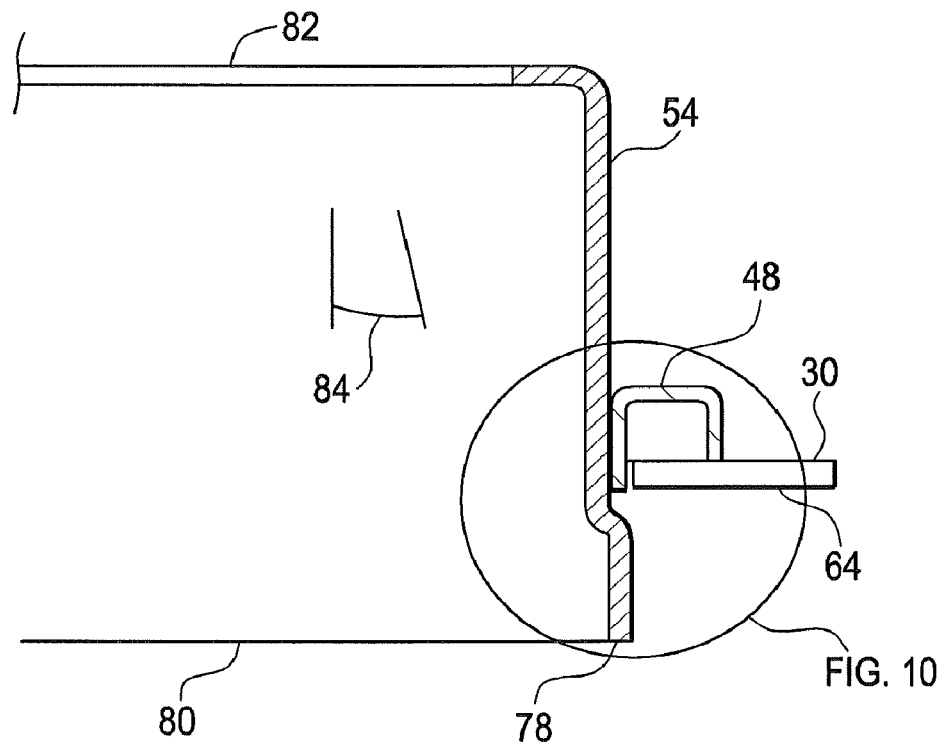
FIG. 9 is a partial side plan sectional view illustration of an alternate embodiment drawout interface in the racked-out position.

Referring to FIGS. 2-4, the positions of the drawout system 20 will be described. The drawout system 20 is used to allow an operator to physically connect and remove the circuit breaker 36 into and out of connection with the electrical circuit 22 without having to manually remove the cabling or other electrical connections. An operator may need to disconnect the circuit breaker 36 so that downstream maintenance tasks may be performed for example. To accomplish this, the circuit breaker 36 is mounted to a drawout mechanism 40 as is known in the art. The drawout mechanism 40 includes means for moving the circuit breaker 36 into and out of contact with electrical contacts 42, 44. The inlet contacts 42 connect the circuit breaker 36 to the power source 26 while the outlet contacts 44 provide a connection to the load 24. When the drawout mechanism 40 moves the circuit breaker 36 away from the contacts 42, 44 (FIG. 3, FIG. 4), the electrical connection is broken and no electrical power can flow from the power source 26 to the load 24.

In general, drawout systems have three positions in which the circuit breaker 36 may be positioned. In the racked-in position illustrated in FIG. 2, the circuit breaker 36 is coupled to the contacts 42, 44 and electrical power will flow if the circuit breaker 36 is closed. At the opposite end of the range of travel is the withdrawn or "racked-out" position illustrated in FIG. 4. In the racked-out position, the circuit breaker is disconnected from the contacts 42, 44. Further, when in the racked-out position, the drawout system 20 will typically have an interlock arrangement that prevents the circuit breaker 36 from being operated. Finally, as illustrated in FIG. 3, intermediate to the racked-in and racked-out positions is what is commonly referred to as the test position. When in the test position, the circuit breaker 36 is not interlocked and may be operated so that the functions of the circuit breaker may be tested.

It should be appreciated that even when the circuit breaker 36 is in the racked-out position, the drawout system 20 may contain active or live electrical connections. Therefore, it is desirable to prevent objects, such as fingers or wires for example, from coming into contact with the electrical connections. The ingress protection (IP) is defined by international standard IEC 60529 for various application or protection ratings. In the case of drawout system 20, it is desirable to achieve an IP4X rating, meaning that objects greater than 1 mm in diameter can not access live electrical components.

Figure 10:
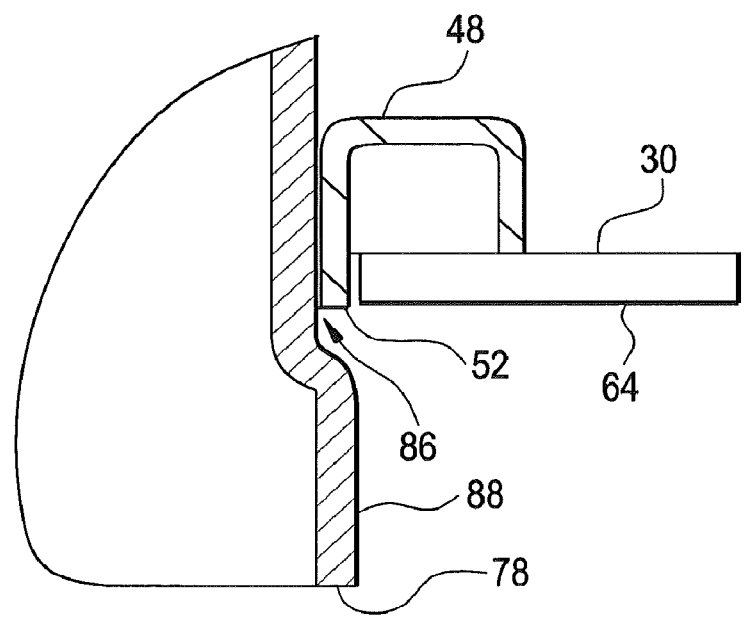
FIG. 10 is a detailed side plan sectional view illustration of the drawout interface of FIG. 9.
Figure 11:
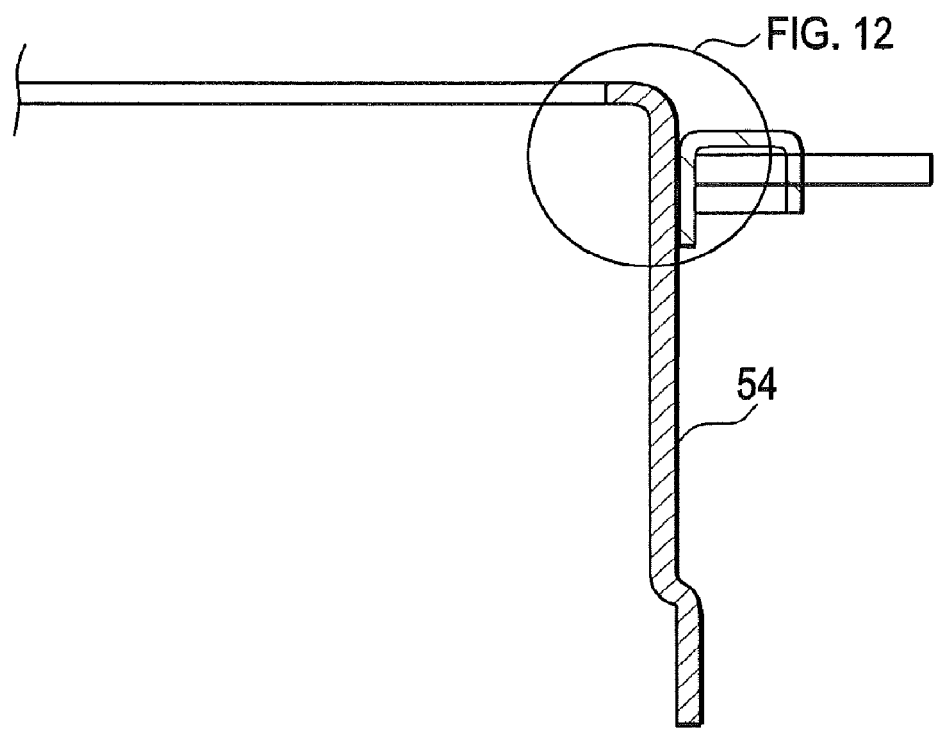
FIG. 11 is a partial side plan sectional view illustration of the drawout interface embodiment of FIG. 9 in the racked-in position; and, FIG. 12 is a detailed side plan sectional view illustration of the drawout interface of FIG. 11.
Figure 12:
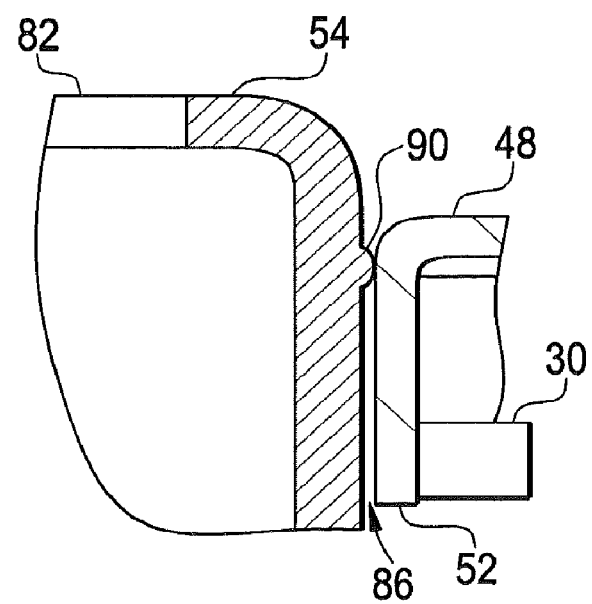

Since the circuit breaker 36 moves relative to a stationary door 30, a drawout interface 46 is provided to maintain the desired IP rating for the drawout system 20. Referring now to FIGS. 2-8, the exemplary embodiment drawout interface is discussed. The drawout interface 46 includes a flange 48 that is mounted to the front side 66 of door 30. The flange 48 is arranged around the periphery of the opening 34. The flange includes a plurality of holes 50 that are sized to receive fasteners 68, such as a bolt or rivet for example. The flange 48 also includes a projection 52 (FIG. 10) that extends into the opening 34 and covers the edge of the door 30.

A sleeve 54 is positioned with the opening 34. As will be discussed in more detail below, the sleeve is arranged to move within the opening 34 as the circuit breaker 36 moves from the racked-in to the racked-out position. The sleeve 54 includes an interior portion 56 formed by sidewalls 58. The interior portion is sized to allow the operator access to the circuit breaker operating handle 70. The sleeve 54 is coupled to the door 30 via springs 60. In one embodiment, the springs 60 are attached by fasteners to projections 62 that extend from the sidewalls 58. The opposite ends of the springs attach to the backside 64 of door 30. In the exemplary embodiment, the springs 60 are a leaf type spring that attaches to the door 30 by fasteners 68. A pair of springs 60 are positioned adjacent two of the sidewalls 58. It should be appreciated that while spring 60 is illustrated in the exemplary embodiment, any suitable elastic member capable of biasing the sleeve towards the circuit breaker 36 when the door 30 is in a closed position. Therefore, the spring 60 may be an extension spring, a compression spring, a torsion spring, or a Bellville washer for example. The spring 60 may also be an elastic member such as a grommet made from an elastomer, rubber or a polymer for example.

The sleeve 54 is sized such that the gap 86 (FIG. 10) between the sleeve 54 and the flange 48 is sufficiently small to meet or exceed the desired IP rating. This gap 86 needs to be maintained as the sleeve 54 travels between the racked-in position, the test position and the racked-out positions. In the exemplary embodiment, the maximum gap size is 1 mm or less to allow an IP4X rating.

A frame 72 is mounted to the front of the circuit breaker 36. The frame 72 provides an additional shield that prevents inadvertent access to electrical components within the drawout system 20. The frame 72 includes a plurality of sidewalls 74 that form a generally hollow interior portion that allows the operator access to the circuit breaker 36 and the circuit breaker handle 70. The sidewalls 74 include a top edge 76 that engages a lower surface 78 on the sleeve 54. As the circuit breaker is moved from the racked-in position (FIG. 2) towards the test position (FIG. 3), the top edge 76 engages the lower surface 78 and translates the sleeve 54 within the opening 34. The bias generated by the springs 60 keeps the top edge 76 and the lower surface 78 in contact during movement. It should be appreciated that while FIG. 2 illustrates a small gap between the top edge 76 and the lower surface 78, in some embodiments, this gap is eliminated and sleeve 54 and the frame 72 are sized and arranged such that the top edge 76 and the lower surface 78 remain in contact any time the door 30 is in the closed position.

Another embodiment of sleeve 54 is illustrated in FIGS. 9-12. In this embodiment, the sidewalls 58 are formed on a small angle 84 such that an end 80 closest to the circuit breaker 36 has a larger width and length than the opposite end 82. For example, if the sleeve 54 is formed by injection molding a polymer, an angle or draft is needed by the manufacturing process to allow the part to be removed from the mold. In one embodiment, the angle 84 is approximately ½ degree per side. While the angle 84 increases the manufacturability of the sleeve 54, this may cause an issue with the IP rating since the gap 86 will increase as the sleeve 54 moves from the racked-out position, illustrated in FIG. 9 and FIG. 10, to the racked-in position, illustrated in FIG. 11 and FIG. 12.

To alleviate this issue and maintain a lower IP rating, the embodiment illustrated in FIGS. 9-12, incorporates features that compensate for the change in gap 86 caused by the draft angle 84. The sleeve 54 includes a lower projection 88 that extends outward from the sidewalls 58. The projection 88 increases the width and length of the end 80 extending the outer surface of the projection 88 beyond the edge of the gap 86. This arrangement creates a labyrinth type path with regards to IP ratings since if an object is inserted into the gap 86, it cannot merely slide into the interior of the drawout system 20, but rather must navigate around the projection 88. Thus, the projection 88 increases the IP rating.

To further accommodate the draft angle 84, the sleeve also incorporates another projection 90. Due to the draft, the gap 86 widens as the circuit breaker 36 moves towards the racked-in position and the end 82 approaches the flange 48. Further, since the projection 88 is further from the opening 34, it provides less of a labyrinth than when in the racked-out or test positions. The projection 90 is offset from the end 82 and positioned to be adjacent to the flange or otherwise inside the opening 34 when the circuit breaker 36 is in the racked-in position. The projection 90 reduces the gap 86, thus improving the IP rating even though the draft angle 84 would otherwise have had a detrimental affect on the IP rating. In one embodiment, the projection 90 is small enough to allow it to be molded and removed from the mold without resorting to complex techniques (e.g. collapsible core molds). In the exemplary embodiment, the projection 90 is 0.2 mm in depth and 1-2 mm wide.

It should be appreciated that the drawout interface 46 arrangement provides a number of advantages to service personnel and in the manufacture of the drawout system 20. The drawout interface 46 allows the manufacturer to fabricate the individual components with lower tolerancing and using less complicated fabrication methods. The drawout interface 46 also allows the installation personnel access to the circuit breaker 36 while minimizing their exposure to electrical components through a low IP ratings. The drawout interface 46 further allows the circuit breaker to be operated with the door open or closed, while maintaining a low IP rating.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A drawout interface comprising:
   a door having a first opening therein, said door having a first side and a second side;
   a frame configured and disposed to be coupled to a circuit breaker front face;
   a flange disposed about said first opening and fixedly coupled to said door first side, said flange having a first projection that extends into said first opening;
   a sleeve movably coupled to said door second side and positioned within said first opening, said sleeve having a second opening therethrough, the sleeve being configured and disposed to extend toward the frame; and,
   a spring coupled between said sleeve and said door second side.

2. The drawout interface according to claim 1, wherein the sleeve abuts the frame.

3. The drawout interface of claim 1 wherein said sleeve includes a first end and a second end opposite said first end, said first end being adjacent said door first side when said sleeve is in a first position and said second end being adjacent said door second side when said sleeve is in a second position.

4. The drawout interface of claim 3 wherein said sleeve includes a plurality of sidewalls extending around the periphery of said second opening.

5. The drawout interface of claim 4 wherein said sleeve further includes a second projection opposite said second opening and extending from said sidewalls, said second projection being offset from said first end wherein said second projection is adjacent said first projection when said sleeve is in said first position.

6. The drawout interface of claim 5 wherein said sleeve further includes a third projection coupled to said sidewalls at said second end, wherein said third projection is adjacent said door second side when said sleeve is in said second position.

7. The drawout interface of claim 6 further comprising a plurality of fasteners coupling said flange to said door and said spring.

8. The drawout interface of claim 6 wherein said sleeve and said flange are sized such that a gap between said sleeve and said first projection provides ingress protection for objects having a size of 1 mm or greater.

9. A drawout interface comprising:
   a door having a first side and a second side and a first opening extending therethrough;
   a frame configured and disposed to be coupled to a circuit breaker front face;
   a flange mounted to said door first side and extending around the periphery of said first opening, said flange having a first projection extending into said first opening;
   a sleeve coupled to the door second side and configured to move between a first position and a second position within said first opening wherein a first gap is formed between said sleeve and said flange, said sleeve being sized such that said first gap is equal to or less than a predefined distance when said sleeve is in said second position, the sleeve being further configured and disposed to extend toward the frame; and
   a biasing member coupled between said door second side and said sleeve, said biasing member being arranged to bias said sleeve toward said first position.

10. The drawout interface according to claim 9, wherein the sleeve abuts the frame.

11. The drawout interface of claim 9 wherein said sleeve further includes a second projection extending from the periphery of said sleeve and offset from one end, said second projection being positioned to be adjacent said first projection when said sleeve is in said first position.

12. The drawout interface of claim 11 wherein said second projection is sized to form a second gap between said second projection and said flange, wherein said second gap is equal to or less than said predefined distance when said sleeve is in said first position.

13. The drawout interface of claim 12 wherein said sleeve comprises a third projection extending from one end, said third projection being positioned to be adjacent said door second side when said sleeve is in second position.

14. The drawout interface of claim 13 wherein said predefined distance provides an ingress protection for an object sized 1 mm or greater.

15. A drawout mechanism comprising:
a housing;
a mechanism within said housing and movable between a first position, a second position and a third position;
a circuit breaker coupled to said mechanism, wherein said circuit breaker being electrically connected to electrical contacts in said first position, and disconnected from said electrical contacts when in said second and third positions, said circuit breaker having a front face opposite said electrical contacts;
a door rotatably coupled to said housing, said door having first side and a second side and a first opening therein;
a flange mounted to the first side of the door, the flange being arranged around a periphery of the first opening;
a frame coupled to said circuit breaker front face, said frame having an edge opposite said front face;
a sleeve coupled to the second side of the door and movably positioned within said first opening and having a plurality of sidewalls extending about a periphery, said sidewalls defining a second opening therethrough, said sleeve further having a surface along one end of said sidewalls wherein said sleeve is positioned such that said surface contacts said edge when said mechanism is in said second position and said third position, the sleeve being configured and disposed to extend toward the edge of the frame; and,
a leaf-type spring coupled between said sleeve and said door.

16. The drawout mechanism according to claim 15, wherein the sleeve abuts the edge of the frame.

17. The drawout mechanism of claim 15, wherein the flange includes a projection that extends into the first opening.

18. The drawout mechanism of claim 17 wherein said sleeve further includes a first projection opposite said second opening and extending from said sidewalls, said first projection being offset from an end opposite said surface, wherein said first projection positioned to be adjacent said first opening when said mechanism is in said first position.

19. The drawout mechanism of claim 18 wherein said first projection and said first opening are sized such that a gap between said first projection and said door when said mechanism is in said first position is equal to or less than 1 mm.

20. The drawout mechanism of claim 19 wherein said sleeve includes a second projection coupled to said sidewalls, said second projection being in contact with said door when said mechanism is in said third position.

* * * * *